United States Patent
Shoji et al.

(10) Patent No.: US 10,198,175 B2
(45) Date of Patent: Feb. 5, 2019

(54) INFORMATION PROCESSING APPARATUS FOR RECOGNIZING AN INPUTTED CHARACTER BASED ON COORDINATE DATA SERIES

(71) Applicant: SONY CORPORATION, Minato-ku (JP)

(72) Inventors: Yuki Shoji, Tokyo (JP); Yukiko Akiyama, Tokyo (JP); Yoshinobu Endo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 146 days.

(21) Appl. No.: 14/374,630

(22) PCT Filed: Feb. 20, 2013

(86) PCT No.: PCT/JP2013/000949
§ 371 (c)(1),
(2) Date: Jul. 25, 2014

(87) PCT Pub. No.: WO2013/128850
PCT Pub. Date: Sep. 6, 2013

(65) Prior Publication Data
US 2014/0380253 A1 Dec. 25, 2014

(30) Foreign Application Priority Data
Mar. 2, 2012 (JP) .................. 2012-046633

(51) Int. Cl.
| | |
|---|---|
| G06F 1/16 | (2006.01) |
| G06F 9/448 | (2018.01) |
| G06F 17/30 | (2006.01) |
| G06F 3/01 | (2006.01) |
| G06F 3/0481 | (2013.01) |
| G06F 3/0482 | (2013.01) |
| G06F 3/0484 | (2013.01) |

(Continued)

(52) U.S. Cl.
CPC .......... *G06F 3/04883* (2013.01); *G06F 3/017* (2013.01); *G06F 3/0483* (2013.01);
(Continued)

(58) Field of Classification Search
CPC .... G06F 3/04883; G06F 3/017; G06F 3/0481; G06F 3/0488; G06F 3/0482;
(Continued)

(56) References Cited

U.S. PATENT DOCUMENTS 5,995,978 A * 11/1999 Cullen ............... G06F 17/30247
7,953,730 B1 * 5/2011 Bleckner ........... G06F 17/30864
707/722

(Continued)

FOREIGN PATENT DOCUMENTS

JP 2006-155424 A 6/2006

OTHER PUBLICATIONS

International Search Report dated May 21, 2013, in PCT/JP13/00949 filed Feb. 20, 2013.

*Primary Examiner* — Shourjo Dasgupta
(74) *Attorney, Agent, or Firm* — Chip Law Group

(57) ABSTRACT

An information processing apparatus comprising a coordinate input unit for inputting coordinate data series, a recognition unit for recognizing a character based on the coordinate data series inputted, and a page/note management unit for managing a data aggregate of the character recognized as a page, receiving a search condition from a user, and managing one or more page aggregates hit by the condition as notes.

10 Claims, 9 Drawing Sheets

(51) Int. Cl.
*G06F 3/0485* (2013.01)
*G06F 3/0488* (2013.01)
*H04M 1/725* (2006.01)
*H04N 1/00* (2006.01)
*H04N 5/445* (2011.01)
*G06F 3/0483* (2013.01)

(52) U.S. Cl.
CPC ........ *G06F 3/0488* (2013.01); *G06F 3/04842* (2013.01); *G06F 3/04886* (2013.01); *G06F 17/30637* (2013.01); *G06F 17/30991* (2013.01)

(58) Field of Classification Search
CPC ............... G06F 3/0416; G06F 3/04847; G06F 3/04845; G06F 3/0486; G06F 3/04817; G06F 17/30991; G06F 17/30274; G06F 2203/04827; G06F 1/1626; G06F 1/1632; G06F 9/4443; H04M 1/72583; H04N 5/44543; H04N 1/00442; G06K 2209/01; G06K 2209/00; G06K 2209/011; G06K 2209/013
USPC ................ 715/863, 810, 835, 838, 845, 864
See application file for complete search history.

(56) References Cited

U.S. PATENT DOCUMENTS

| | | | |
|---|---|---|---|
| 8,423,541 B1* | 4/2013 | Baluja | G06F 17/30867 707/732 |
| 8,527,291 B1* | 9/2013 | Kochendorfer | G06Q 10/10 705/2 |
| 8,954,447 B1* | 2/2015 | Chatterjee | G06F 17/30056 707/736 |
| 9,031,937 B2* | 5/2015 | Guha | G06F 17/30672 707/723 |
| 2002/0176628 A1* | 11/2002 | Starkweather | G06F 17/30011 382/229 |
| 2004/0139400 A1* | 7/2004 | Allam | G06F 17/212 715/201 |
| 2004/0161150 A1* | 8/2004 | Cukierman | G06K 9/222 382/186 |
| 2005/0091578 A1* | 4/2005 | Madan | G06F 17/241 715/201 |
| 2006/0143558 A1* | 6/2006 | Albornoz | G06F 3/0483 715/205 |
| 2008/0250012 A1* | 10/2008 | Hinckley | G06F 17/30864 |
| 2008/0294632 A1* | 11/2008 | Chang | G06F 17/30722 |
| 2010/0026798 A1* | 2/2010 | Schmid | A61B 5/0002 348/61 |
| 2010/0241947 A1* | 9/2010 | Dahn | G06F 17/30637 715/233 |
| 2011/0125800 A1* | 5/2011 | Seager | H04L 63/0227 707/790 |
| 2011/0283242 A1* | 11/2011 | Chew | G06F 17/30994 715/863 |
| 2013/0212463 A1* | 8/2013 | Pachikov | G06F 17/2765 715/234 |
| 2013/0289428 A1* | 10/2013 | Patel | A61B 5/686 600/521 |

\* cited by examiner

INFORMATION PROCESSING APPARATUS FOR RECOGNIZING AN INPUTTED CHARACTER BASED ON COORDINATE DATA SERIES

TECHNICAL FIELD

The present technology relates to an information processing apparatus such as a personal computer on which a touch panel, for example, is mounted, and to a method of processing information.

BACKGROUND ART

An apparatus having a UI (User Interface) using a touch panel is widely used. The touch panel is also used for operating the UI of a PC (Personal Computer). The touch panel allows a handwriting character input in combination with a character recognition technology, and can provide comfort operability to a user who is not accustomed to a key board operation.

In a tablet type personal computer, any memo can be made by handwriting. When an operator selects at least one part of writing strokes on the memo, characters within the selected part are recognized and the recognized result can be sent to a text input item as proposed by Patent Document 1, for example.

Patent Document 1: Japanese Patent Application Laid-open No. 2006-155424

SUMMARY OF INVENTION

Problem to be Solved by the Invention

It is common to save data such as a memo inputted by handwriting using a touch panel as a file in an information processing apparatus such as a personal computer. However, the memo simply saved as the file requires complicated operations including user operations to open the file and to find the intended file, when a user want to look a plurality of memos at the same time or to look a plurality of memos highly relevant.

In view of the above-described circumstances, an object of the present technology is to provide an information processing apparatus and a method of processing information with improved operability.

Means for Solving the Problem

In order to solve the above-described problems, an information processing apparatus according to the present technology includes a coordinate input unit for inputting coordinate data series; a recognition unit for recognizing a character based on the coordinate data series inputted; a page/note management unit for managing a data aggregate of the character recognized as a page, receiving a search condition from a user, and managing one or more page aggregates extracted based on the condition as notes.

The information processing apparatus may further includes a display processing unit for displaying the page/note managed.

The display processing unit may display a reduced size image of the page.

The page/note management unit manages meta data relating to the page by linking the meta data with the page, and searches the meta data based on the condition.

The meta data includes a word inputted by the user.

A method of processing information according to another aspect of the present technology includes inputting coordinate data series by a coordinate input unit; recognizing a character based on the coordinate data series inputted in a recognition unit; managing a data aggregate of the character recognized as a page, receiving a search condition from a user, and managing one or more page aggregates extracted based on the condition as notes by a page/note management unit.

Effect of the Invention

As described above, according to the present technology, the operability of the information processing apparatus can be improved.

MODES FOR CARRYING OUT THE INVENTION

Hereinafter, embodiments according to the present disclosure will be described with reference to the drawings.

First Embodiment

The present embodiment relates to an information processing apparatus having a display on which a touch panel is disposed. In an application operation environment displayed on the display, an input using a pointing device such as a pen, a user's finger and a mouse can be processed.

Information Processing Apparatus

Figure 1:
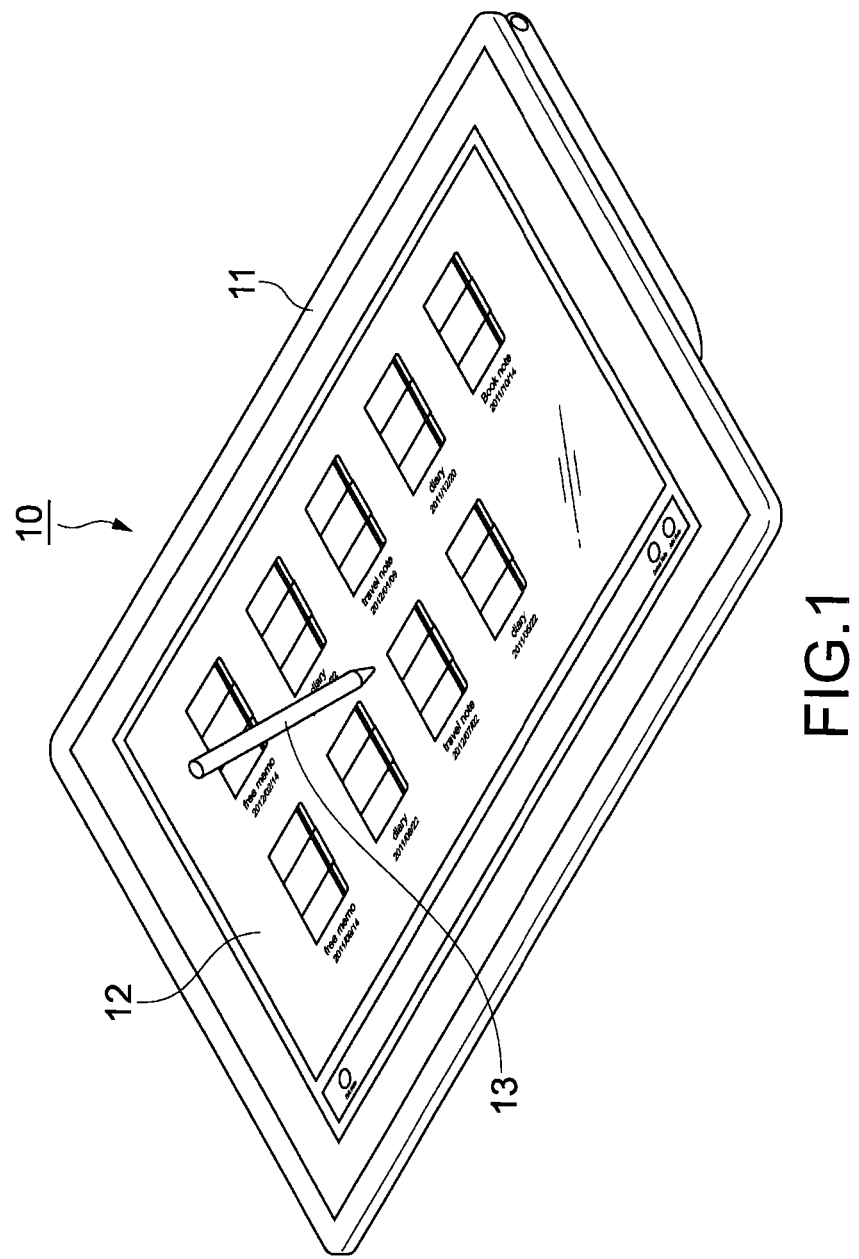
FIG. 1 An appearance view of an information processing apparatus in a first embodiment of the present technology.

FIG. 1 is an appearance view of an information processing apparatus in a first embodiment of the present technology.

An information processing apparatus 10 is a so-called tablet type personal computer.

The information processing apparatus 10 has a thin plate housing 11, and a display screen unit 12 disposed at one main surface of the housing 11.

The display screen unit 12 has a display panel and a touch panel. As the display panel, a liquid crystal display is used. As the touch panel, an electrostatic capacitance type touch panel is used, for example.

At the housing 11, along with the display screen unit 12, an USB terminal, a headphone output terminal, a memory card slot, a speaker, a microphone, a camera (not shown) and the like are disposed.

Figure 2:
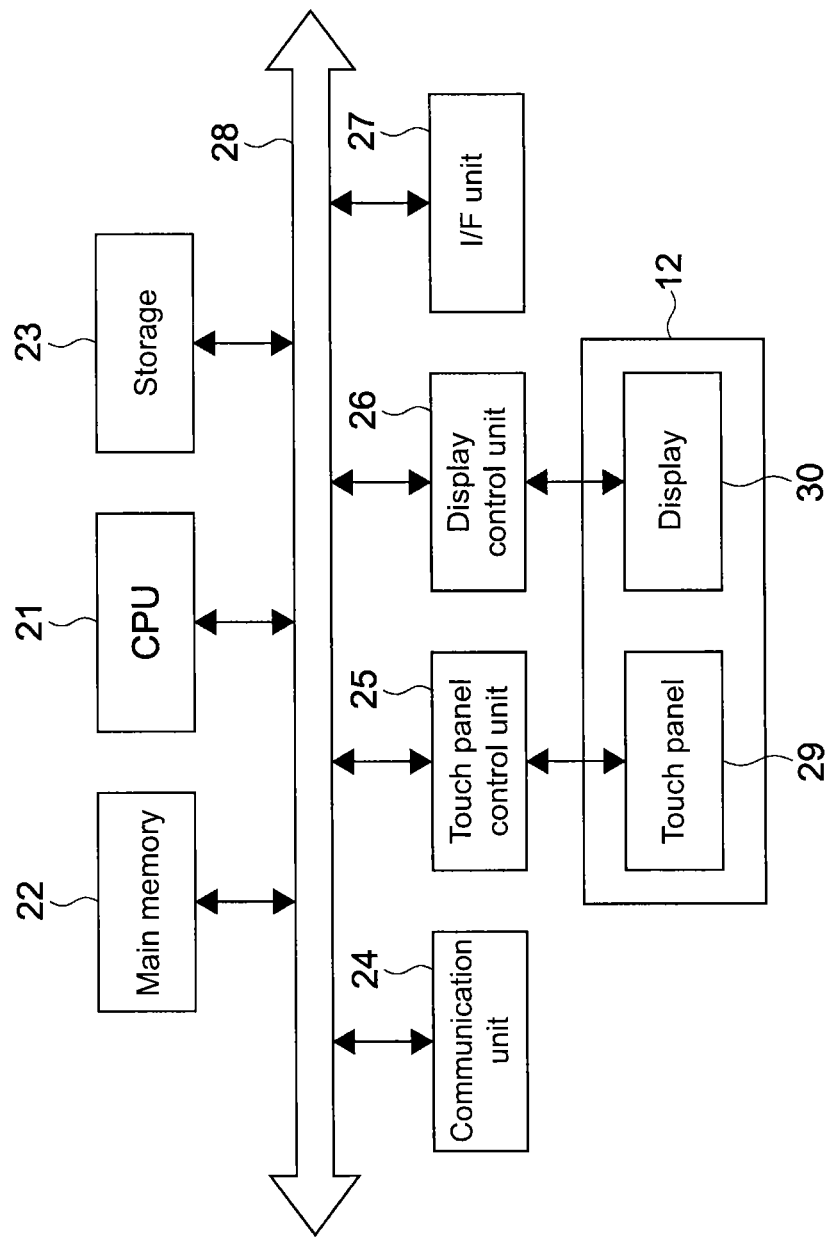
FIG. 2 A hardware configuration of the information processing apparatus in FIG. 1.

FIG. 2 is a diagram showing a hardware configuration of the information processing apparatus 10.

The information processing apparatus 10 has a CPU 21, a main memory 22, storage 23, a communication unit 24, a touch panel control unit 25, a display control unit 26, an interface unit 27 and a system bus 28.

The CPU 21 controls hardware of the information processing apparatus 10 and executes an arithmetic processing for executing an application.

The main memory 22 is used as a work area for the CPU 21.

The storage 23 is a readable and writable memory for storing a variety of data including an operating system, an application program and user data. The application program creates and manages pages and notes based on handwritten input data. Hereinafter, the application is called as "a note management application".

The communication unit 24 executes processing to establish a networking and communicate with external devices. Examples of the communication unit 24 include a wireless LAN device, a near field communication device, an infrared communication device and the like.

The touch panel control unit 25 drives and controls the touch panel 29.

The display control unit 26 generates display data to be supplied to a display 30.

The interface unit 27 controls input and output of data with a USB terminal, a head phone output terminal, a memory card slot, a camera and the like.

[Note Management Application]

The note management application activates the CPU 21 as an operation unit.

Figure 3:
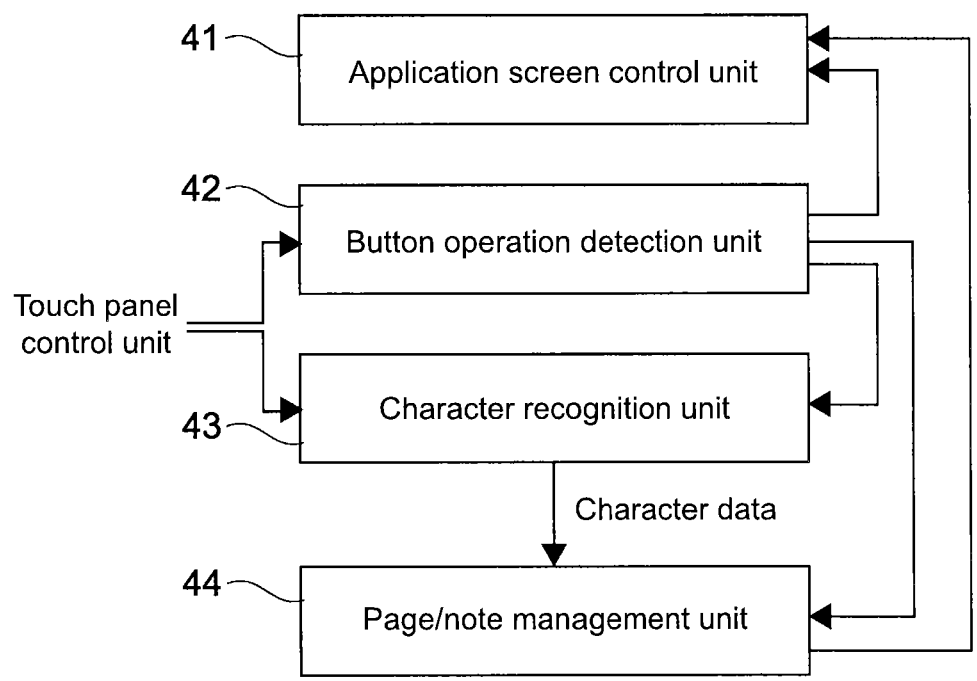
FIG. 3 A block diagram showing a functional configuration of the information processing apparatus in FIG. 1.

FIG. 3 is a block diagram showing a functional configuration of the information processing apparatus 10.

An application screen control unit 41 (display processing unit) generates a variety of screens including a graphical user interface and a reply screen of the note management application, and controls, e.g., switches them.

A button operation detection unit 42 generates an input event corresponding to the operation by each button disposed on a screen of the note management application based on coordinate data supplied from the touch panel control unit 25 (a coordinate input unit), and supplies the input event to other operation unit.

A character recognition unit 43 recognizes a character in coordinate data series supplied from the touch panel control unit 25 (the coordinate input unit).

A page/note management unit 44 executes a variety of processing and management, e.g., creates, saves, reads out, searches or sorts the pages and the notes that are aggregate units of user data.

Next, the page and the notes will be described.

Figure 4:
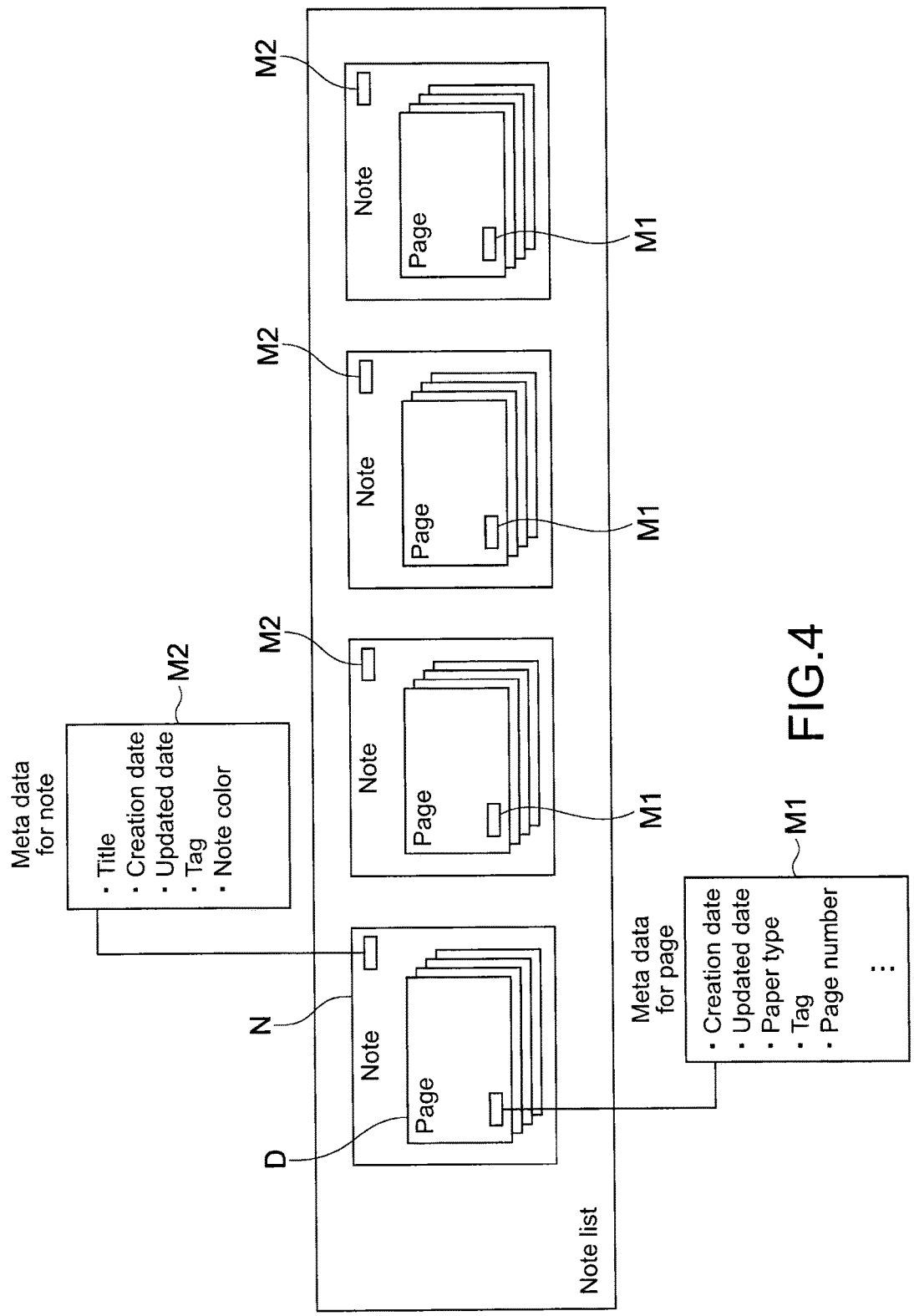
FIG. 4 A view for illustrating pages and notes.

FIG. 4 is a view for illustrating the pages and the notes.

A page P is a minimum unit of data aggregates input by a user's handwriting. The page P is seen as a piece of paper from the user on the display screen unit 12.

To the page P, a creation date, an updated date, a belonged note, a type of paper, a page number, a meta tag, a thumb nail image etc. are added as meta data M1.

The creation date is time and date when the page P is created.

The updated date is time and date when the page P is updated.

The belonged note is a note N to which the page P is belonging, and the note N is an aggregate unit of one or more of pages P. The note N will be described later in detail.

The type of paper is a class sorted by a paper format. A plurality of papers having a plurality of classes are selected by the user's preferences, and the user can handwrite in accordance with the paper format.

The page number is a sequence of the page P in the note N.

The tag is added information composed of words, for example, a heading, remarks, etc. inputted by the user appropriately.

The thumb nail image is a reduced size image of the page P, and is used for showing a list of the page P, for example.

The note N is an aggregate unit of one or more pages P. The note N is seen as one note from the user on the display screen unit.

To the note N, a title, a creation date, an updated date, a page number, a tag, a note color etc. are added as meta data M2.

The title is a name added to the note N. The title is automatically added by the note management application, but can be added by inputting any title by the user.

The creation date is time and date when the note N is created.

The updated date is time and date when the note N is updated.

The page number is a number of a page included in the note N.

The tag is added information composed of words, for example, a heading, remarks, etc. inputted by the user appropriately.

[User Interface]

Next, a user interface of the note management application will be described.

To the information processing apparatus 10, the user operates and instructs to start the note management application. Then, the note management application is loaded from the storage 23 to the main memory 22, and is started.

Once the note management application is started, an initial screen is generated by the application display control unit 41 and is displayed on the display 30.

As the initial screen, it assumes that a list of the notes is displayed.

(Note List Screen)

Figure 5:
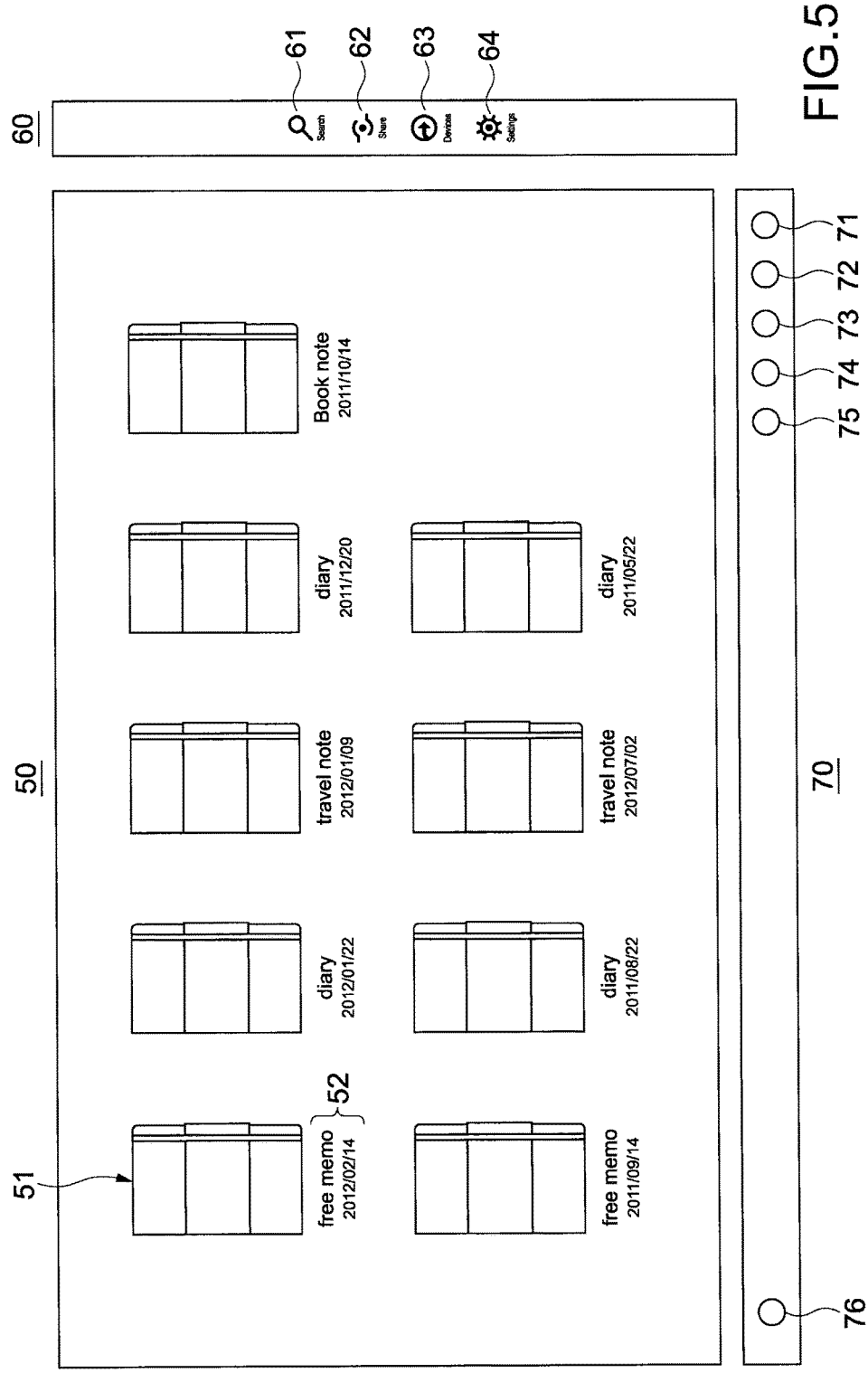
FIG. 5 A view showing a note list screen.

FIG. 5 is an example of a note list screen 50.

On the note list screen 50, if the note is already saved, objects 51 corresponding to the respective notes are displayed. The objects 51 corresponding to the notes are designs of abstracted notes, and are different from typical icons in that attributes added to the notes are reflected by appearances of the objects 51 in terms of colors. In FIG. 5, the attributes are not reflected by the appearances of the objects 51. Each object 51 displays correspondingly a word example showing attribute information 52 such as a name, a creation date and an updated date of the note. In the note list screen 50, the object 51 corresponding to each note is arranged in accordance with predetermined sort conditions (the order of the title, the order of the creation date, the order of the updated date, the order of the size (the page number)). Sorting conditions can be selected/changed by a user's operation of a button.

The note list screen 50 can further display a main operation bar 60 and a note operation bar 70 as the graphical user interfaces.

The main operation bar 60 has a search button 61, a share button 62, a device button 63, a setting button 64 and the like.

The search button 61 is to invoke a search operation screen.

The share button 62 is to invoke a function to upload a content including a photo to a content share site on a web.

The device button 63 is to invoke information about devices mounted to the information processing apparatus 10.

The setting button 64 is to invoke a variety of setting screens in the information processing apparatus 10.

The main operation bar 60 is also displayed on screens other than the note list screen 50.

The note operation bar 70 has a plurality of buttons 71, 72 and 73 for receiving a variety of instructions about the note operation such as addition, deletion and sorting of notes, a label color setting button 74, a tag generation button 75 and a page list display button 76.

The label color setting button 74 is to invoke a function to set colors of the objects 51 in the note. According to the embodiment, there is adopted a design that a part of the objects 51 is considered as a label, and a color of the label can be changed by a setting.

The tag generation button 75 is to invoke a function to create the meta data per note (a meta data creation function). Specifically, the meta data creation function receives an input of word data including a title and remarks from a user, and saves it into the storage 23 as the meta data by liking with the note.

The page list display button 76 is to invoke a page list screen of the note selected by a user.

(Page List Screen)

Figure 6:
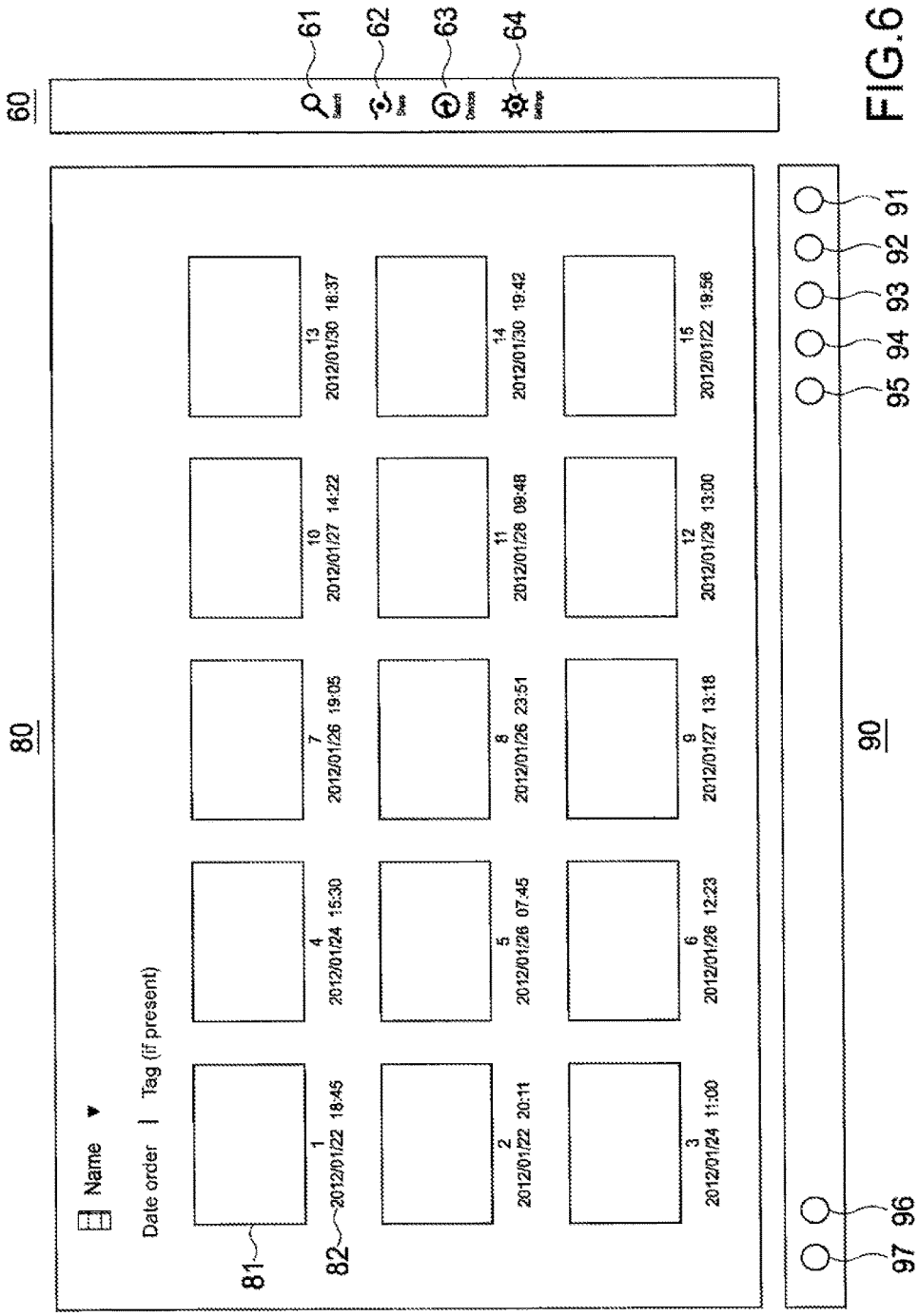
FIG. 6 A view showing a page list screen.

FIG. 6 is a view showing a page list screen.

In a page list screen 80, a list of one or more pages belonging to the selected note is displayed. The pages displayed are reduced size images (thumb nail images) 81. To the reduced size images 81 of the respective pages, attribute information 82 such as the sequence in the note, the creation date and the updated date are displayed correspondingly.

On the page list screen 80, the above-described main operation bar 60 and a page operation bar 90 can be further displayed as the graphical user interface.

The page operation bar 90 has a plurality of buttons for receiving instructions about the page operation such as addition, sorting (moving) and deletion of pages, a smart note creation button 94, a tag generation button 95, a return button 96, an edit button 97 and the like.

The smart note creation button 94 is to invoke a function to create a new note as a smart note from one or more pages searched under the condition specified by the user about all pages belonging to the selected note.

The tag generation button 95 is to invoke a function to create a page tag. A tag creation function stores word data such as remarks inputted freely by the user as a tag of the page of interest into the storage 23.

The return button 96 is to instruct to return to a previous screen (the note list screen 50).

The edit button 97 is to invoke an edit screen of the page selected by the user.

(3. Page Edit Screen)

Figure 7:
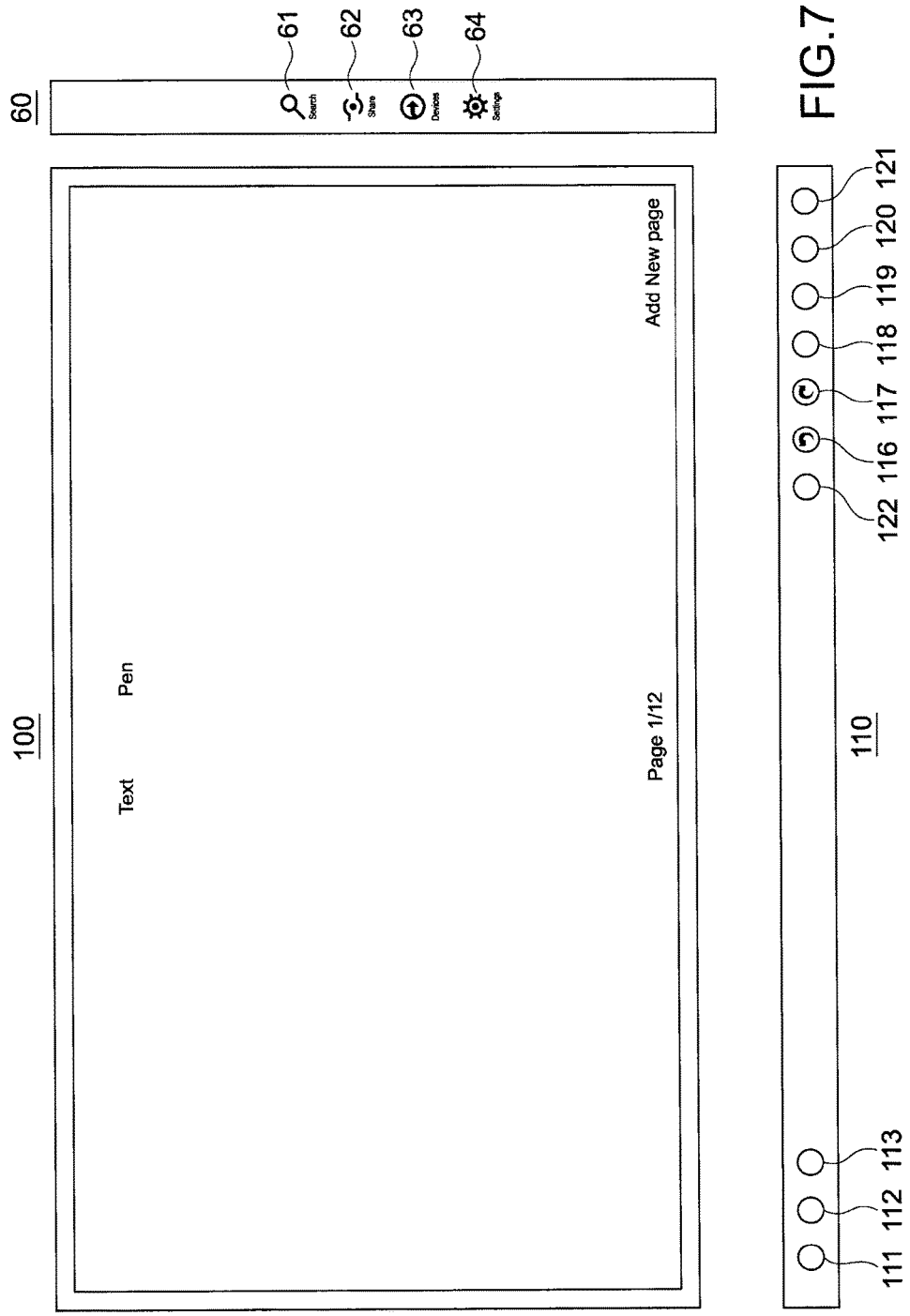
FIG. 7 A view showing an edit screen.

FIG. 7 is a view showing an edit screen.

On an edit screen 100, a pen 13 for the touch panel (hereinafter referred simply as "pen") shown in FIG. 1 is used to execute a handwriting input, and a page is edited by text input using a software key board.

The page edit screen 100 further displays an edit operation bar 110.

The edit operation bar 110 has a return button 111, a view mode button 112, a slide button 113, a text input button 114, a pen input button 115, an undo button 116, a redo button 117, a select button 118, a paper change button 119, an import button 120, a page delete button 121, a page add button 122 and the like.

The return button 111 is to instruct to return to a previous screen (a page list screen 80).

The view mode button 112 is to switch the page edit screen 100 to a look only mode (a view mode) to inhibit edit and input of/to the page edit screen 100. When the button is operated in the view mode, the view mode is canceled, and the page edit screen 100 can be edited and inputted.

The slide button 113 is to invoke a function to slide display the pages belonging to the note of interest.

The text input button 114 is to invoke a function to input text data using a software keyboard to the page edit screen 100.

The pen input button 115 is to invoke a function to handwrite words using the pen on the page edit screen 100.

When the handwriting input function is invoked, a pen selection window (not shown) for selecting a type of the pen is displayed on the page edit screen 100. Using the pen selection window, the user can select a type of the pen including a ball-point pen, a marker, a brush, a pencil, an eraser, etc. and can also select of a width the pen (a width of a writing stroke), a color (a color of a writing stroke), etc. A selection of the pen can be confirmed by the user in a writing stroke confirmation area disposed within the pen selection window.

To the undo button 116, an undo function is assigned.

To the redo button 117, a redo function is assigned.

The selection button 118 is to invoke a function to select an area from the page or to select a text.

The paper change button 119 is to invoke a function to select a type of the paper.

The import button 120 is to invoke a function to import a file or data and to arrange it on the page.

The page delete button 121 is to delete the page under editing.

The page add button 122 is to add a page.

(Paper Selection Screen)

On the above-described page edit screen 100, the paper change button 119 is operated to display a paper selection screen.

Figure 8:
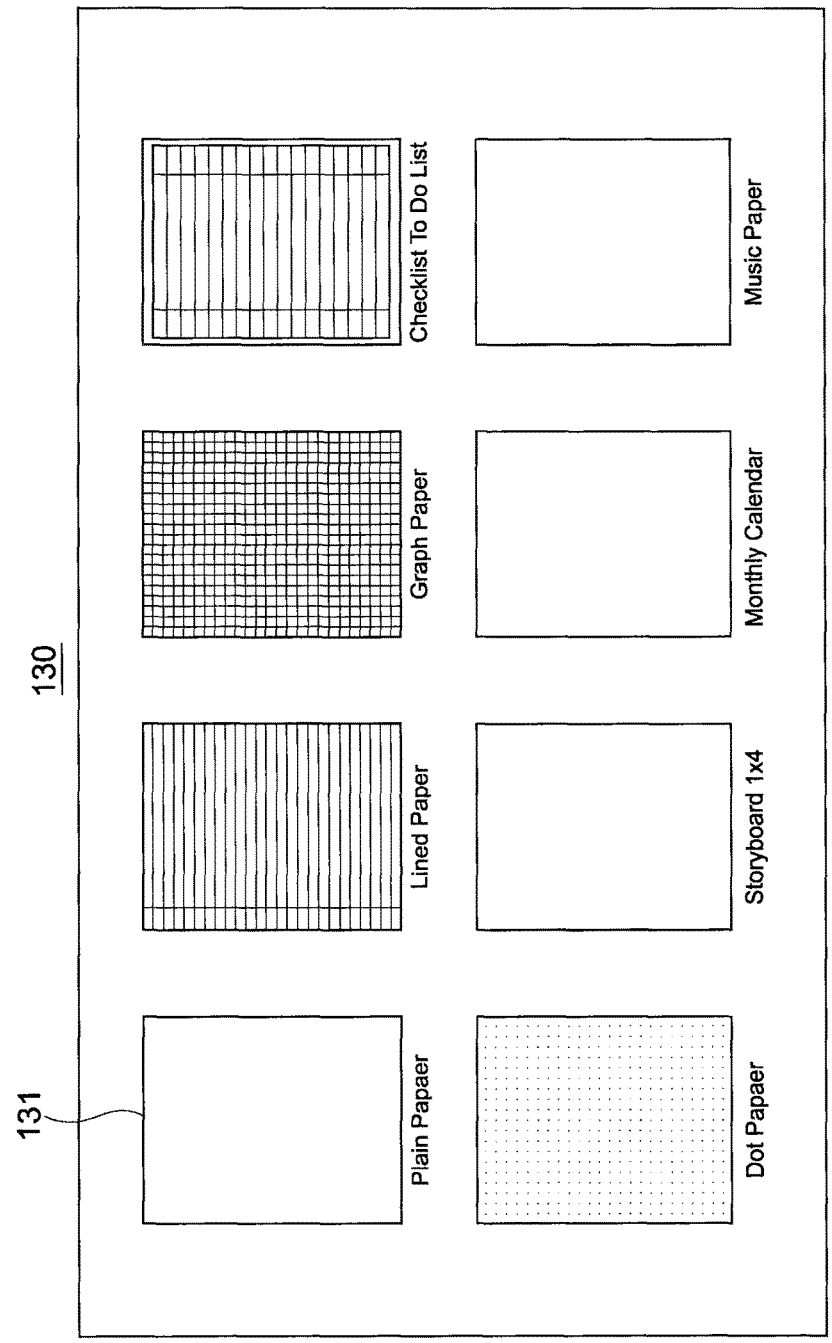
FIG. 8 A view showing a paper selection screen.

FIG. 8 is a view showing a paper selection screen.

On a paper selection screen 130, a list of a plurality of paper format images 131 is shown as candidates. When a desirable type of paper is selected from the candidates 131 by a user's touch operation, the format of the paper selected is adopted as a format of a page to be edited.

[Operation of Note Management Application]

Next, an operation of the information processing apparatus 10 by a note management application will be described.

It assumes that a page belonging to a certain note is edited.

When the pen input button 115 of the page edit screen 100 is operated by a user to activate the handwriting input function, the character recognition unit 43 executes character recognition to the coordinate data series outputted from the touch panel control unit 25. Character data as a result of the character recognition becomes display data by the application screen control unit 41 and is displayed on the page edit screen 100. Also, character data inputted using the software key board is displayed on the screen by the application screen control unit 41.

In the page edit on the page edit screen 100, a user can reflect the format of the paper on the page under editing by operating the paper change button 119 to invoke the paper selection screen 130, set or change the type of the paper.

When the page edit is completed by the operation of the return button 96, the page/note management unit 44 stores the character data inputted on the page edit screen 100 into the storage 23 as user data per page, and also stores the updated date, the type of the paper, the note belonged, a storage location of the thumb nail image into the storage 23 as the meta data of the page of interest.

Next, it assumes that it returns to the display of the page list screen 80 by the operation of the return button 96.

The user can invoke the tag creation function by the operation of the tag generation button 95 on the page list screen 80, and set the tag to the above-described page. The set tag is added to the meta data stored on the storage 23 by the page/note management unit 44.

Similarly, the page number in the note is added to the meta data by the page/note management unit 44.

As to the respective notes displayed on the note list screen 50, the title, the creation date, the updated date, the page number, the tag, the color of the note etc. are similarly stored on the storage 23 by the page/note management unit 44 as the meta data of the note of interest.

(Smart Note Creation 1)

Next, an operation to create a new node (a smart note) by searching a page matched with a search condition specified arbitrarily by a user from a page group belonging to one note will be described.

First, the user invokes the page list screen 80 belonging to the note to be intended.

Figure 9:
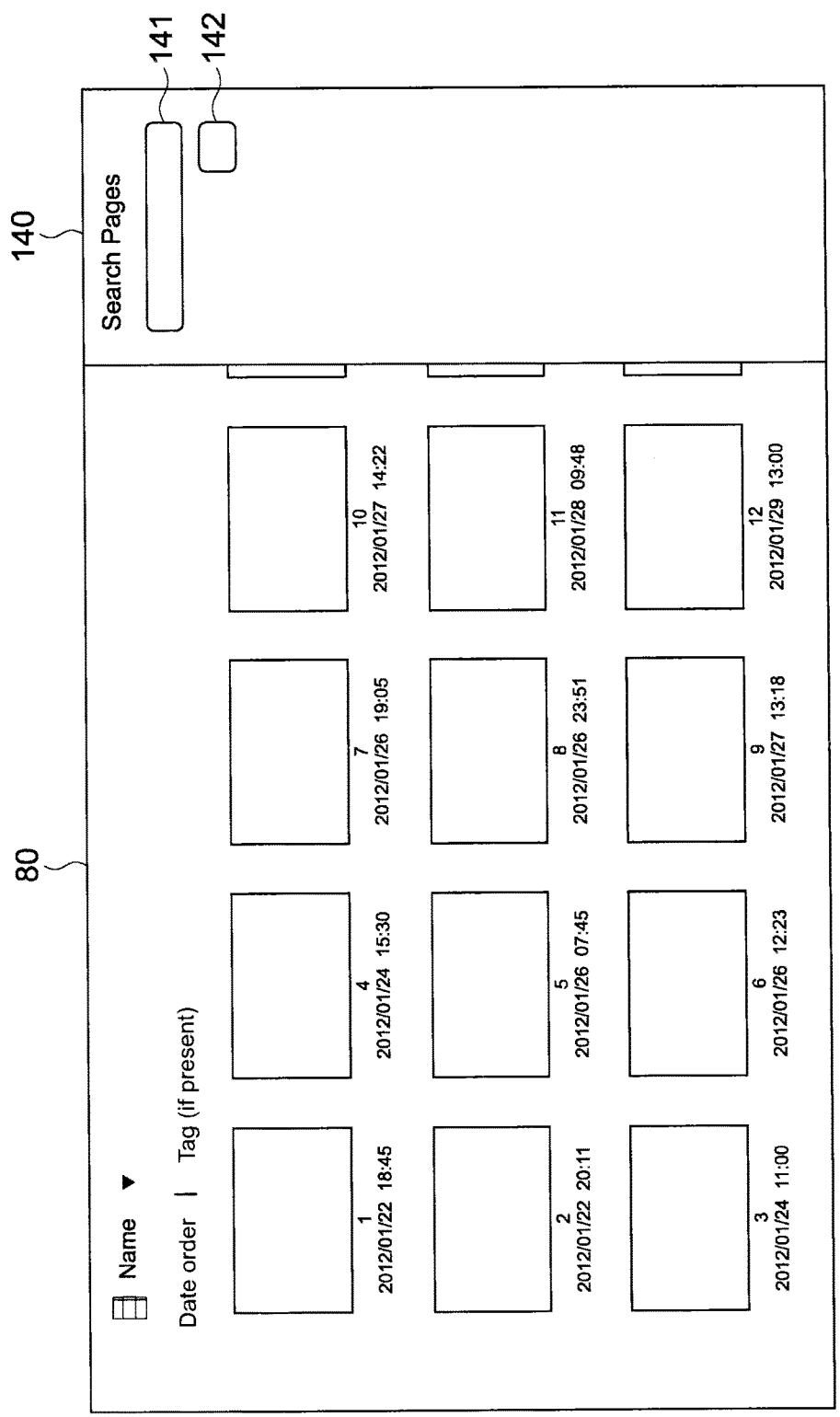
FIG. 9 A view showing a search operation screen.

On the page list screen 80, when the search button 61 in the main operation bar 60 is operated by the user, a search operation screen 140 is displayed as shown in FIG. 9. To a text box 141 of the search operation screen 140, the user inputs a keyword for the search conditions using a software keyboard. When a search execution button 142 of the search operation screen 140 is operated by the user, the page/note management unit 44 searches the page including a search keyword in the meta data.

For example, it assumes that a "cook" is inputted as the search keyword. In this case, all pages including the "cook" in the meta data are searched and are displayed on the page list screen 80. In order to provide the pages hit by the free word search, it is beneficial to utilize the application by setting one or more words corresponding to the page contents as a tag by the user.

It should be appreciated that dates (a creation date, a last update date) or types of paper can be used as the search keywords.

The page groups searched and collected on the page list screen 80 can be sorted again in accordance with any sorting conditions. For example, sorting can be executed again in accordance with a date order, a type order of paper or the like.

Thereafter, when the user operates the smart note creation button 94 (FIG. 6) disposed on the page operation bar 90 displayed together with the page list screen 80, the page/note management unit 44 newly creates a note for collecting the pages displayed on the page list screen 80. As the note created is configured of the pages narrowed by the user specified keywords, it might be said that the note is easy to use information for the user.

After the smart note is created, a display is switched to the note list screen 50 by the application screen control unit 41. At this time, the note list screen 50 displays a newly created smart note added to the existing note. Alternatively, the display may be temporarily controlled such that the smart note newly added is recognized at a glance. For example, there is a method to display and emphasize the smart note newly added for a given length of time by a color, a size and a position of the object.

In general, a title is put to the note. A title including the search keyword may be automatically generate and put to the smart note added. In this way, the user can know what keyword is used to search the smart note. Also, as the manual input operation by the user to add the title, the user's operability is improved.

(Smart Note Creation 2)

Next, an operation to create a new node (a smart note) by searching a page matched with a search condition specified arbitrarily by a user from a page group belonging to all notes or a plurality of notes selected by the user will be described.

The user invokes the note list screen.

When the user operates search button 61 in the main operation bar 60 on the note list screen 50, the search operation screen 140 is displayed as shown in FIG. 9. To a text box 141 of the search operation screen 140, the user inputs a search keyword using a software keyboard. When the search execution button 142 of the search operation screen 141 is operated by the user, the page/note management unit 44 searches the page including the search keyword in the meta data from all notes. The following operations are similar to those when the user creates the new node (the smart note) by searching the page matched with the search condition specified arbitrarily by the user from the page group belonging to one note.

On the note list screen 50, the user can select the note to be searched by operating the selection button that can select individual note and search the page from the narrowed notes.

Alternative Embodiment 1

The note and the page may be searched separately, i.e., in two stages, to create the smart note.

In this case, the page/note management unit 44 searches the note including the search keyword in the meta data and then searches the page group belonging to the note. At this time, different keywords may be used to search the note and the page.

Alternative Embodiment 2

In the above-described embodiments, the search is executed by comparing the meta data to the search keyword. Alternatively, the search may be executed by comparing the user data to the search keyword.

The present technology may have the following configurations.

(1) An information processing apparatus, including:

a coordinate input unit for inputting coordinate data series;

a recognition unit for recognizing a character based on the coordinate data series inputted;

a page/note management unit for managing a data aggregate of the character recognized as a page, receiving a search condition from a user, and managing one or more page aggregates extracted based on the condition as notes.

(2) The information processing apparatus according to the above (1), further including:

a display processing unit for displaying the page/note managed.

(3) The information processing apparatus according to the above (1) or (2), in which the page/note management unit manages the meta data relating to the page by linking the meta data with the page, and searches the meta data based on the condition.

(4) The information processing apparatus according to any one of the above (1) to (3), in which the meta data includes a word inputted by the user.

(5) The information processing apparatus according to any one of the above (1) to (4), in which the display processing unit displays a reduced size image of the page.

DESCRIPTION OF REFERENCE NUMERALS 10 information processing apparatus
25 touch panel control unit
41 application screen control unit
42 button operation detection unit
43 character recognition unit
44 page/note management unit

The invention claimed is:

1. An information processing apparatus, comprising:
circuitry configured to:
  receive input of coordinate data series;
  recognize a plurality of characters based on the inputted coordinate data series;
  manage a data aggregate of the recognized plurality of characters as a first page of a plurality of pages;
  receive a search condition from a user input;
  extract a set of pages of the plurality of pages based on the search condition;
  manage the set of pages as a newly created note; and
  display, on a display screen, the newly created note with a title of the newly created note,
  wherein the title includes a search keyword based on the search condition, and
  wherein the newly created note is visually distinguishable from existing notes for a period of time, based on a display size of the newly created note.

2. The information processing apparatus according to claim 1, wherein the circuitry is further configured to:
  link meta data with the first page to manage the meta data that relates to the first page; and
  search the meta data based on the search condition.

3. The information processing apparatus according to claim 2, wherein the meta data includes a word input by the user input.

4. The information processing apparatus according to claim 1, wherein the circuitry is further configured to display a reduced size image of the first page.

5. The information processing apparatus according to claim 1, wherein the newly created note is visually distinguished further based on at least one of a display color or a display position of the newly created note.

6. The information processing apparatus according to claim 1, wherein the circuitry is further configured to:
  receive selection of a paper format for the plurality of pages; and
  search the plurality of pages based on the paper format.

7. The information processing apparatus according to claim 6, wherein the circuitry is further configured to receive the selection of one of a plain paper, a lined paper, a graph paper, a checklist, a to do list, a dot paper, a storyboard, a monthly calendar, or a music paper as the paper format for the plurality of pages.

8. The information processing apparatus according to claim 1, wherein the circuitry is further configured to receive the input of the coordinate data series from a pen as a pointing device.

9. The information processing apparatus according to claim 8, wherein the circuitry is further configured to receive selection of at least one of a type, a width, or a color of the pen.

10. A method of processing information, comprising:
  receiving input of coordinate data series;
  recognizing a plurality of characters based on the inputted coordinate data series;
  managing a data aggregate of the recognized plurality of characters as a first page of a plurality of pages;
  receiving a search condition from a user input;
  extracting a set of pages of the plurality of pages based on the search condition;
  managing the set of pages as a newly created note; and
  displaying, on a display screen, the newly created note with a title of the newly created note,
  wherein the title includes a search keyword based on the search condition, and
  wherein the newly created note is visually distinguishable from existing notes for a period of time, based on a display size of the newly created note.

* * * * *